United States Patent
Stursa et al.

(10) Patent No.: US 8,676,459 B2
(45) Date of Patent: Mar. 18, 2014

(54) POWERTRAIN FOR A VEHCILE AND SYSTEM AND METHOD FOR CONTROLLING THE POWERTRAIN

(75) Inventors: Darren F. Stursa, Galloway, OH (US); Joshua D. Sigmund, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 558 days.

(21) Appl. No.: 12/973,366

(22) Filed: Dec. 20, 2010

(65) Prior Publication Data

US 2012/0158257 A1    Jun. 21, 2012

(51) Int. Cl.
  *F16H 59/48*    (2006.01)
  *G06F 7/00*    (2006.01)

(52) U.S. Cl.
  USPC .............. 701/58; 701/51; 477/97; 477/120; 477/904

(58) Field of Classification Search
  USPC .............. 701/51, 54, 52, 55, 58; 477/115, 97, 477/120, 904
  See application file for complete search history.

(56) References Cited

U.S. PATENT DOCUMENTS

| | | | |
|---|---|---|---|
| 5,487,005 A | 1/1996 | Genise | |
| 5,490,063 A | 2/1996 | Genise | |
| 5,509,867 A | 4/1996 | Genise | |
| 5,925,087 A * | 7/1999 | Ohnishi et al. | 701/70 |
| 6,116,105 A | 9/2000 | Genise et al. | |
| 6,347,269 B1 * | 2/2002 | Hayakawa et al. | 701/51 |
| 7,162,353 B2 * | 1/2007 | Minowa et al. | 701/96 |
| 2002/0099490 A1 * | 7/2002 | Wakamatsu et al. | 701/90 |
| 2009/0192664 A1 | 7/2009 | Wolfgang et al. | |
| 2012/0296538 A1 * | 11/2012 | Kresse | 701/54 |

FOREIGN PATENT DOCUMENTS

| | | |
|---|---|---|
| JP | 7-300031 A | 11/1995 |
| JP | 2008-201401 A | 9/2008 |

* cited by examiner

*Primary Examiner* — Christine Behncke
(74) *Attorney, Agent, or Firm* — Kenealy Vaidya LLP

(57) ABSTRACT

A system and method for controlling a powertrain of a vehicle having an engine configured to output a variable torque, can include a transmission with a plurality of gear ratios and selectively driven by the variable torque, and a pair of wheels selectively driven by the transmission. The system can include a longitudinal acceleration sensor and a controller. The controller can be in electrical communication with the longitudinal acceleration sensor. The controller can be configured to determine an inertial value of the vehicle based on data from the longitudinal acceleration sensor prior to a shift from one of the plurality of gear ratios to another of the plurality of gear ratios. The controller can also be configured to determine a first estimate of a real-time torque value based on at least one of an engine map, the plurality of gear ratios, a torque converter map and driveline losses, and to determine a second estimate of a real-time torque value based on the inertial value and data from the longitudinal acceleration sensor, during the shift from the one of the plurality of gear ratios to the another of the plurality of gear ratios.

20 Claims, 3 Drawing Sheets

POWERTRAIN FOR A VEHCILE AND SYSTEM AND METHOD FOR CONTROLLING THE POWERTRAIN

BACKGROUND

1. Field

The present invention relates to devices and systems useful as a powertrain of a vehicle, and methods for controlling such a powertrain.

2. Description of the Related Art

Existing vehicles powered by an internal combustion engine use a multi-ratio transmission to modify the torque produced by the internal combustion engine and then to output the modified torque to the drive wheels of the vehicle. It can be advantageous to determine the real-time value of the torque output by the transmission for certain performance enhancement systems and methods such as, but not limited to, traction control, dynamic stability control, or all-wheel-drive control.

Systems and methods that can sense or otherwise determine the actual torque output of the transmission in real time can be complex in design, expensive to assemble and/or maintain, and/or lack sufficient durability and/or reliability for daily use in certain weather conditions for a vehicle. These and other factors can outweigh the benefits or advantages that such systems and methods can provide.

Thus, systems and methods have been developed that can estimate the actual torque output of the transmission using systems and components that can be used advantageously on a vehicle. These conventional systems and methods typically rely on data from any one or combination of, an engine map, transmission gear ratio value(s), transmission shift status, a torque converter map, and driveline losses to estimate the real-time modified torque. These conventional systems and methods also can utilize other parameters known in the art when estimating the real-time torque output by the transmission.

Certain of these conventional systems and methods can provide an estimation of the real-time torque output by the transmission. However, the estimation may be inaccurate during a shift (up or down) from a one gear ratio to another gear ratio. In multi-ratio transmissions utilizing a plurality of gears to provide the plurality of gear ratios, a plurality of clutches are used to selectively engage/disengage certain combinations of the gears in order to couple the transmission output to the transmission input via the appropriate gear ratio. Typically, more than one clutch in the transmission is actuated to select and deselect the relevant gear ratio. Any variation in the actuation rate and actuation pressure of each clutch involved in the shift can cause a fluctuation in the torque output by the transmission. The actuation rate and pressure of each clutch can also vary over the lifetime of the transmission. Thus, it can be difficult to accurately model the transmission of torque through each relevant clutch during each operation of the relevant clutch(es) accurately and reliably over the lifetime of the vehicle even when subject to reasonable maintenance of the vehicle.

This inaccuracy can be exaggerated when the estimated torque is utilized by a controller via a control algorithm that distributes torque individually between wheels of a powertrain. This distribution can be effected, for example, between the left and right wheels in a two-wheel drive powertrain, between the front and rear wheels in an all-wheel drive powertrain, or between the left rear wheel and the right rear wheel in an all-wheel drive powertrain. Thus, there is a need to provide a control system and method to control a powertrain with improved accuracy for estimating available torque during a shift operation in the transmission.

SUMMARY

According to one aspect of the disclosure a system for controlling a powertrain of a vehicle having an engine configured to output a variable torque, a transmission with a plurality of gear ratios and selectively driven by the variable torque, and a pair of wheels selectively driven by the transmission, the system can include a longitudinal acceleration sensor and a controller. The controller can be in electrical communication with the longitudinal acceleration sensor. The controller can configured to: determine an inertial value of the vehicle based on data from the longitudinal acceleration sensor prior to a shift from one of the plurality of gear ratios to another of the plurality of gear ratios; determine a first estimate of a real-time torque value based on at least one of an engine map, the plurality of gear ratios, a torque converter map and driveline losses; and determine a second estimate of a real-time torque value based on the inertial value and data from the longitudinal acceleration sensor during the shift from the one of the plurality of gear ratios to the another of the plurality of gear ratios.

According to an aspect of the disclosed subject matter, a method for controlling an all-wheel drive powertrain of a vehicle having an engine outputting a variable torque, a transmission with a plurality of gear ratios and selectively driven by the variable torque of the engine, a pair of wheels selectively driven by the transmission, and a longitudinal acceleration sensor, the method can include: determining an inertial value of the vehicle based on data from the longitudinal acceleration sensor prior to a shift from one of the plurality of gear ratios to another of the plurality of gear ratios; determining a first estimate of a real-time torque value based on at least one of an engine map, the plurality of gear ratios, a torque converter map and driveline losses; and determining a second estimate of a real-time torque value based on the inertial value and data from the longitudinal acceleration sensor during the shift from the one of the plurality of gear ratios to the another of the plurality of gear ratios.

According to another aspect of the disclosed subject matter, a vehicle powertrain can include an engine configured to output a variable torque, a transmission including a plurality of gear ratios and selectively driven by the variable torque, a pair of wheels selectively driven by the transmission, a longitudinal acceleration sensor, and a controller. The controller can be in electrical communication with the longitudinal acceleration sensor and configured to: determine an inertial value of the vehicle based on data from the longitudinal acceleration sensor prior to a shift from one of the plurality of gear ratios to another of the plurality of gear ratios; determine a first estimate of a real-time torque value based on at least one of an engine map, the plurality of gear ratios, a torque converter map and driveline losses; and determine a second estimate of a real-time torque value based on the inertial value and data from the longitudinal acceleration sensor during the shift from the one of the plurality of gear ratios to the another of the plurality of gear ratios.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
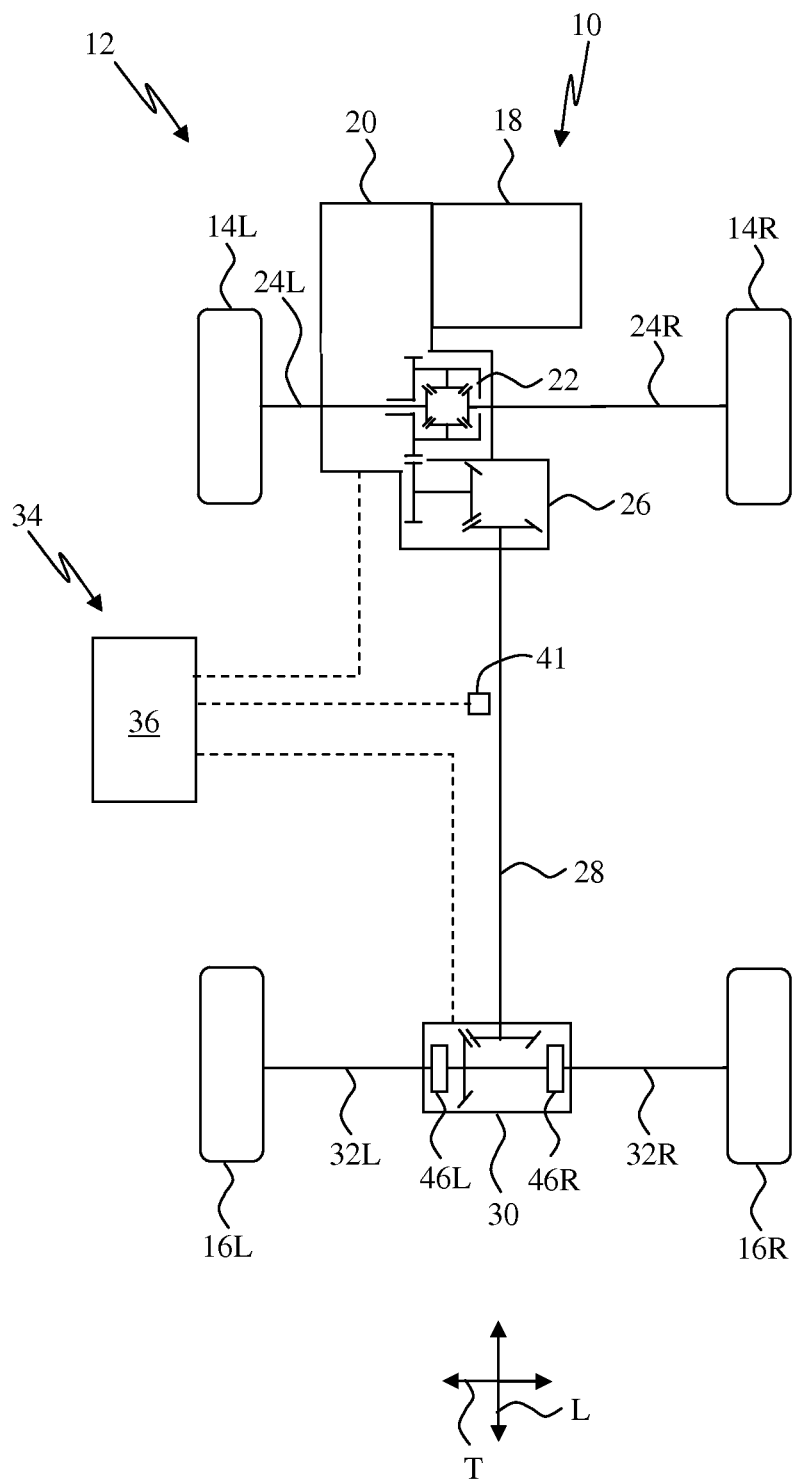
FIG. 1 is a schematic view of an exemplary powertrain for a vehicle made in accordance with principles of the disclosed subject matter.

FIG. 1 illustrates an embodiment of a powertrain 10 for a vehicle 12, where the vehicle 12 has a longitudinal direction L and a transverse direction T perpendicular to the longitudinal direction. The powertrain 10 can be configured as an on-demand, part-time, all-wheel drive system in accordance with principles of the disclosed subject matter. This exemplary powertrain 10 can be configured such that the steerable front wheels 14L, 14R are the primary drive wheels and the rear wheels 16L, 16R are automatically selectively driven when additional tractive effort is advantageous for the given vehicle conditions. However, the powertrain 10 can also be configured such that the rear wheels 16L, 16R are the primary drive wheels and the front wheels 14L, 14R are driven to supplement the tractive effort. In other embodiments, the powertrain 10 can be configured as: a full-time all-wheel drive system; a manually-engageable, part-time all-wheel drive system; a front-wheel drive system; or a rear-wheel drive system, all of which are generally known in the art.

The powertrain 10 can include the pair of front wheels 14L, 14R, the pair of rear wheels 16L, 16R, a power source 18, a transmission 20, a front differential assembly 22, a pair of front driveshafts 24L, 24R, a power-take-off assembly 26, a propeller shaft 28, a rear differential assembly 30, a pair of rear driveshafts 32L, 32R, all arranged in a manner known in the art, and a control system 34. The power source 18 can be an internal combustion engine, a hybrid of an internal combustion engine and an electric motor, an electric motor, or other known power source. The transmission 20 can be a multi-ratio transmission where the ratios are provided in discrete steps via a geartrain or where the ratios are provided in an infinitely variable manner between a minimum ratio and a maximum ratio.

The control system 34 can be configured to automatically engage/disengage the rear wheels 16L, 16R with the power source 18 and the transmission 20, as appropriate. An exemplary control system is disclosed in co-pending U.S. patent application Ser. No. 12/847,880, entitled "Control System and Method for Automatic Control of Selection of On-Demand All-Wheel Drive Assembly for A Vehicle Drivetrain", and filed Jul. 30, 2010, which is incorporated herein by reference in its entirety.

The control system 34 can include a controller 36, an accelerometer 41 and a pair of clutch assemblies 46L, 46R. The controller 36 can be referred to as an electronic control unit (ECU) or as a central processing unit (CPU). The ECU 36 can be in electrical communication with the transmission 20, the accelerometer 41 and each of the clutch assemblies 46L, 46R. The ECU 36 can also be in electrical communication with sensor(s) and/or other controller(s) associated with the power source 18, power train 19, and/or, specifically, the transmission 20.

The accelerometer 41 can be mounted on an appropriate portion of the vehicle 12 to detect acceleration of the vehicle 12 in the longitudinal direction L. The raw data from the accelerometer 41 can be processed by the accelerometer 41, or by the ECU 36, into a signal indicative of the acceleration of the vehicle 12 in the longitudinal direction L. Accelerometers and their use are known in the art.

The pair of clutch assemblies 46L, 46R can be components of the rear differential assembly 30. The clutch assemblies 46L, 46R can be configured in any manner known in the art deemed suitable for use in an on-demand all-wheel-drive powertrain (or other drive wheel configurations).

Based on data received from the accelerometer 41 and the transmission 20, the ECU 36 can manipulate the clutch assemblies 46L, 46R to vary the distribution of torque produced by the power source 18, multiplied by the transmission 20, and routed through one or both of the clutch assemblies 46L, 46R to the respective rear wheel 16L, 16R. This manipulation can, among other features, enhance the tractive effort of the vehicle 12 when the vehicle 12 travels along a low traction surface such as, but not limited to, wet, snowy, icy, gravel, or muddy surfaces. Further, this manipulation of the clutches 46L, 46R can enhance the actual and/or perceived performance of the vehicle 12 as it enters, traverses and/or exits a curve. Specifically, the ECU 36 can distribute torque through only one of the clutch assemblies 46L, 46R or send a greater amount of torque through one of the clutch assemblies 46L, 46R than through the other of the clutch assemblies 46L, 46R such that an advantageous amount of torque can be sent to the rear wheel (16L or 16R) with the most effective traction and/or to enhance the steering of the vehicle 12 via torque vectoring.

In alternate embodiments, additional inputs can be used that are known in the art to be appropriate for manipulation of the clutch assemblies 46L, 46R. Examples of such can include, but are not limited to, yaw rate, roll rate, acceleration in the transverse direction T (i.e., lateral acceleration), steering angle, brake force, brake pedal position, suspension loads, cargo loads, trailer loads, air temperature, surface conditions (such as, but not limited to, dry, wet, snowy, icy, surfaces), and surface type (such as, but not limited to, paved, gravel, sand, dirt, mud, rocky, rutted surfaces).

It is known to control the distribution of torque to the rear wheels 16L, 16R using a torque signal generated by the ECU 36 and/or any appropriate sensor(s) in electrical communication with the ECU 36. The ECU 36 can manipulate this torque signal such that the clutches 46L, 46R distribute the torque from the transmission 20 to the respective rear wheel 16L, 16R in a finely tuned manner.

This fine tuned signaling by the ECU 36 also can permit precise differentiation in the amount of torque transmitted by the clutches 46L, 46R as compared to the amount of torque transmitted to the front wheels 14L, 14R. As a result, the control system 34 can enhance the actual or perceived launching of the vehicle from a stop, and can modulate with finer increments and/or greater confidence the transitions between the two-wheel-drive mode and the all-wheel-drive mode, etc. Also, the control system 34 can enhance performance of the vehicle 12 on a low friction surface, such as but not limited to, wet, icy, snowy, gravel or muddy surfaces. And, the ECU 34 can enhance performance of the vehicle 12 where the wheels (for example, the left wheels 14L, 16L) on one side of the vehicle 12 engage a surface having a coefficient of friction, μ, that is different from the surface engaged by the wheels (for example, the right side wheels 4R, 16R) on the other side of the vehicle 12. This latter condition can be referred to as a split μ surface.

This fine tuned signaling by the ECU 36 also can permit precise differentiation in the amount of torque transmitted by one of the clutches 46L, 46R as compared to the other of the clutches 46L, 46R. As a result, the control system 34 can enhance the operator's steering input to improve the vehicle's tracking into, through and/or out of a corner, etc. This enhancement can also be beneficial to improve steering performance on a low friction surface or on a split μ surface.

Figure 2:
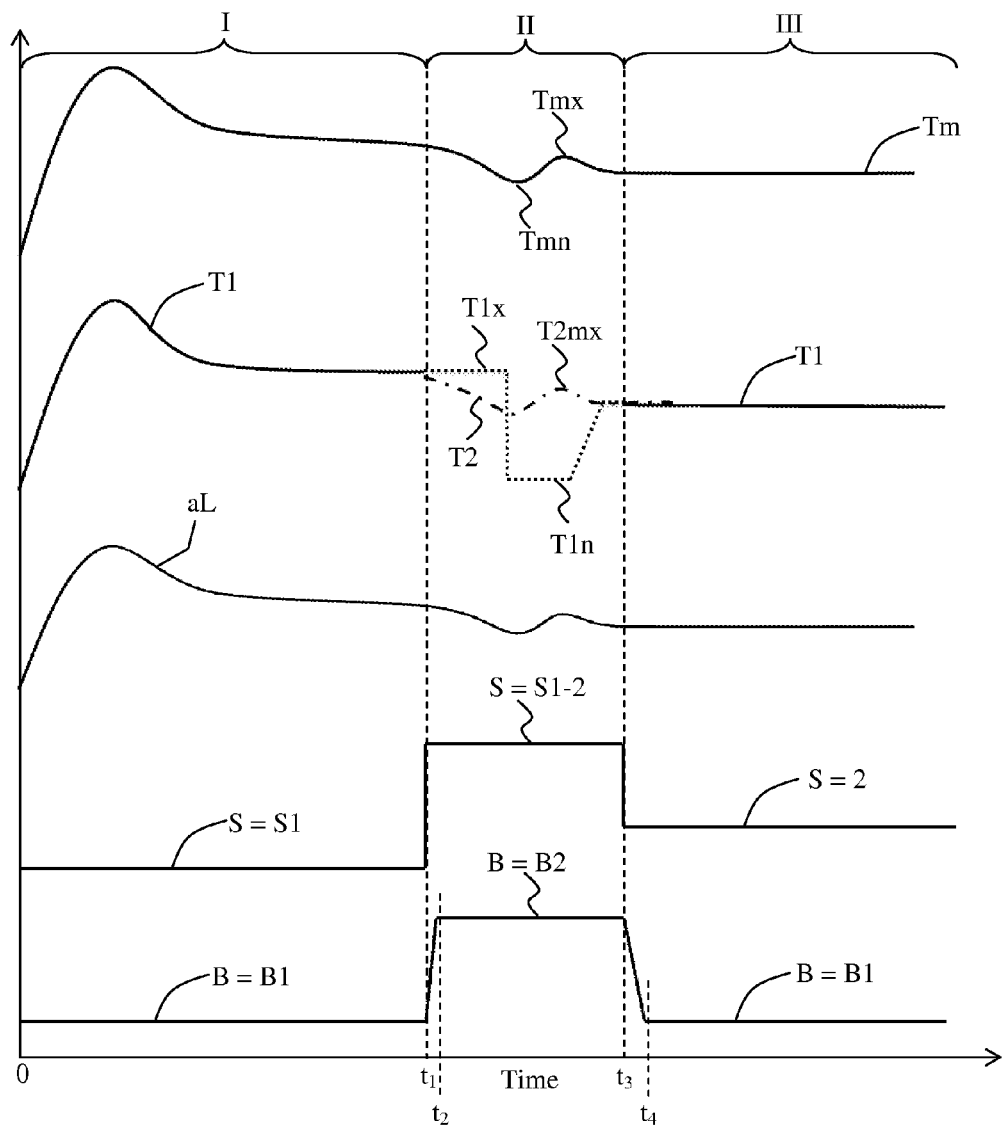
FIG. 2 is a graph depicting a plurality of plots of torque, acceleration and various control signals for a powertrain made in accordance with principles of the disclosed subject matter.

FIG. 2 illustrates various exemplary signals T1, T2, aL, S, B input to and output from the ECU 36 over an exemplary time period. In this example, the time period starts upon initial acceleration of the vehicle 12 from a stop to a time subsequent to the completion of the shift in the transmission 20 from a first gear ratio to a second gear ratio. In this example, the first gear ratio is a ratio higher than the second gear ratio and the second gear ratio is the next closest ratio (of the plurality) to the first gear ratio. However, the principles of the disclosed subject matter are equally applicable to downshifts from a lower gear ratio to a higher gear ratio as well as non-sequential shifting from any one gear ratio to any other gear ratio of the plurality.

FIG. 2 also illustrates an exemplary measured torque signal Tm. The measured torque signal Tm represents the actual torque output by the transmission 20 as measured in real time by instrumentation (not shown) attached to the vehicle 12 in an appropriate manner. This exemplary measured torque signal Tm can be representative of the torque output of the transmission 20 where the power source 18 is configured as an internal combustion engine and the transmission 20 is configured as an automatic transmission coupled to the power source 18 via a torque converter (not shown). Such configurations are known in the art.

The shape of a plot over time of the measured torque signal $T_m$ can be dictated by the torque output generated by the power source 18, transmitted to the transmission 20 via the torque converter and output by the operation of any component(s) of the transmission 20, such as, but not limited to the automated clutches, and the particular numerical values of the gear ratios utilized by the transmission 20. Typically, this measured torque signal Tm is obtained in the lab and might not be available to the ECU 36 during consumer operation of the vehicle 12.

In FIG. 2, the torque signal Tm (as well as the other illustrated signals T1, T2, aL, S, B) can be analyzed over three periods—a first period I, a second period II and a third period III.

The first period I begins at a start time t0 and ends at a first time t1. The transmission 20 is not transmitting torque at the start time t0. The transmission 20 transmits torque in accordance with a first gear ratio immediately after the start time t0 until the first time t1. At the first time t1, a shift in the transmission 20 from a first gear ratio to a second gear ratio begins.

The second period II begins at the first time t1 and ends at a third time t3. A shift from the first gear ratio to the second gear ratio occurs in the transmission 20 beginning at the first time t1 and ending at the third time t3.

As shown in the graph of FIG. 2, the measured torque signal Tm has a local minimum Tmn followed by a local maximum Tmx. The local minimum Tmn can occur closer to the first time t1 than does the local maximum Tmx. The local minimum Tmn can be a result of the disengagement of a first clutch in the transmission 20. The local maximum Tmx can occur closer to the third time t3 than does the local minimum Tmn. The local maximum Tmx can be a result of the engagement of a second clutch and the rotational inertia of the internal combustion engine 20. For purposes of this example, the torque output by the power source 18 is assumed to not change significantly during the second time period II.

During the third period III, the shift in the transmission 20 to the second gear ratio is complete and the torque output from the internal combustion engine 18 is held at a constant value via the operator of the vehicle 12 through the accelerator pedal (not shown). The shape of the measured torque signal Tm during the third period III can vary from what FIG. 2 illustrates if the torque output of the internal combustion engine 20 is altered via the accelerator pedal. However, the principles depicted by FIG. 2 can be equally applicable to a condition where the operator varies the torque output by the power source 18 via the accelerator pedal.

As stated above, the ECU 36 might not be equipped to determine the actual torque output by the transmission 20. Therefore, the ECU 36 can be configured with hardware alone, or in combination with software, to determine an estimate of the actual torque using other sensor(s), component(s) and system(s) that are typically provided on the vehicle 12. For example, a first torque signal T1 can be determined based on any combination of engine map(s), transmission gear ratios, torque converter map(s), and driveline losses. However, other inputs can be used in addition to or in place of these parameters, as known in the art. The formulation of this torque signal is generally known in the art and it will not be described in detail.

The first torque signal T1 of FIG. 2 can represent an exemplary estimate of the actual torque output by the transmission 20. The first torque signal T1 is based on the same operational conditions of the internal combustion engine 18 and the automatic transmission 20 that produced the measured torque signal Tm, namely, engine torque output and a shift from the first gear ratio to the second gear ratio.

In the second period II, a plot of the estimated torque signal T1 can include a local estimated maximum T1x and a local estimated minimum T1n. The local estimated maximum T1x can occur closer to the first time t1 than does the local estimated minimum T1n. The estimated local minimum T1n can occur closer to the third time t3 than does the local estimated maximum T1x.

As can be seen from FIG. 2, the plot of the calculated first torque signal T1 can have a different shape during the second period II as compared to the plot of the measured torque signal Tm. (Note the dotted line portion of the first torque signal T1). This deviation can be caused by factors such as, but not limited to, variations in the actuation timing and actuation pressures of the various clutches involved in the shift from the first gear ratio to the second gear ratio. Over the lifetime of the transmission 20, parts can wear or slightly change in relative position, hydraulic fluid can leak and other conditions within the transmission mechanisms can occur or change without following a pattern. Any one or a combination of these factors can bring about variations in the engagement pressures of the clutches, variations in the disengagement pressures of the clutches, variations in the time for the clutches to disengage the torque path, and variations in the time for the clutches to engage the torque path. These variations can be difficult to predict and, therefore, can be difficult to accurately model in the algorithm utilized by the controller 36 to finely manipulate the rear clutches 46L, 46R. Thus, the first torque signal T1 can deviate from the measured torque signal Tm as shown in FIG. 2.

By way of example only, the first torque signal T1 can represent an overestimate of the actual torque output by the transmission 20 during the initial portion of the second period II, as compared to the measured torque signal Tm. Compare the local minimum Tmn with the estimated local maximum T1x. This overestimation can be a result of the first automated clutch in the transmission 18 disengaging from the torque transmission path of the powertrain 10.

Additionally, the first torque signal T1 can represent an underestimation of the actual torque output of the transmission 20 during the final portion of the second period II, as compared to the measured torque signal Tm. Compare the local maximum Tmx with the estimated local minimum T1n. During this final portion of the second period II, a second clutch engaging the torque transmission path and the rotational inertia of the engine 18 can increase the torque output by the transmission 20.

Although the first calculated torque signal T1 can vary as compared to the measured torque signal Tm output by the transmission 20, these variations should not adversely affect reasonable operation of the vehicle 12. However, these variations can offset or minimize any advantage or benefit to the powertrain 10 that can result from a finely tuned distribution of torque to the rear wheels 16L, 16R, as signaled by controller 36.

In order to maximize the benefit of the fine tuned torque distribution ability available through the ECU 36, the first torque signal T1 can be combined with a second torque signal T2 that can more accurately follow the measured torque signal Tm during the second period II. The dash-dot line of FIG. 2 represents an example of one possible second torque signal T2.

The second torque signal T2 can be derived from data collected by the accelerometer 41. FIG. 2 illustrates a plot of a longitudinal acceleration signal aL that can be derived from data collected by the accelerometer 41. The longitudinal acceleration signal aL can indicate the actual real-time acceleration of the vehicle 12 in the longitudinal direction L during each of the three periods plotted in FIG. 2. In this example, the data collected by the accelerometer 41 can be filtered to derive the longitudinal acceleration signal aL. A filtered acceleration signal aL can provide a smooth inertia value m, the purpose of which will be described below. An exemplary filtering technique can be a standard low pass filter or a standard band pass filter or any other filter known in the art. The filtering process can be performed by the accelerometer 41 or by the ECU 36, either by hardware alone, or in combination with software.

The filter can reduce and/or eliminate fast fluctuations in the acceleration signal. The filter can essentially "slow down" the signal by reducing how fast the acceleration values can change. This can create a much steadier signal that can follow the average values of the acceleration signal aL.

However, it should be noted that it is not necessary to filter the data collected by the accelerometer 41 in order to derive the longitudinal acceleration signal aL. Examples of when it may be possible to forgo filtering of the acceleration signal aL can include, but are not limited to, a situation where the acceleration signal aL is sufficiently smooth or where any subsequent processing of the acceleration signal aL can provide a sufficiently robust result.

The longitudinal acceleration of the vehicle 12 is a function of the torque output by the transmission 20. And, the shape of the plot of the longitudinal acceleration signal aL resultant from the filtered accelerometer data can closely follow the shape of plot of the measured torque signal Tm. The second torque signal T2 can be derived from the longitudinal acceleration signal aL using the equation of motion, F=ma, and the equation of torque, T=Fd. Thus, the second torque signal T2 can be used to more closely estimate the measured torque signal Tm during the second period II.

In order to generate the second torque signal T2, the ECU 36 can estimate the mass (or inertia), m, of the vehicle 12. The vehicle mass, m, can be determined from the longitudinal acceleration signal aL during the first period I and the first torque signal T1 during the first period I, It is noted that the radius of the front wheel (14L or 14R) is cancelled out when calculating the drive torque applied to the vehicle 12. In particular, combining the equations of motion and torque can result in the following equation for the mass, m, of the vehicle 12:

$$m = \frac{T1}{aL}$$

Any change in the load carried by and/or towed by the vehicle 12 can increase or decrease, proportionally, the acceleration signal aL. Thus, the control system 34 can accurately account for changes in the mass, m, due to variations in the load carried by and/or towed by the vehicle 12.

As an alternative to filtering the acceleration signal aL, the signal representing the mass, m, can be filtered. Any of the known filtering techniques discussed above can be used. However, filtering the acceleration signal aL, as compared to filtering the signal for the mass, m, can guard against an inaccurate value for the mass, m being calculated due to influence from an outside source (such as, but not limited to, hitting a bump). Thus, filtering the acceleration signal aL can improve the robustness of the mass calculation.

Then, the so determined mass, m, of the vehicle 12 can be used along with the longitudinal acceleration signal aL obtained during the second period II depicted in FIG. 2 to determine the second torque signal T2 in accordance with the equation:

$$T2 = aL \times m$$

Thus, the second torque signal T2 can accurately reflect changes in the mass, m, due to variations in the load carried and/or towed by the vehicle 12.

A blend factor B can be used by the ECU 36 to provide a smooth transition between the first torque signal T1 and the second torque signal T2. The blend factor B can have a first blend value B1 immediately up to and shortly after a shift from one gear ratio to another in the transmission 20. During the ratio shift, the ECU 36 can ramp up in a linear manner blend factor B from the first blend value B1 to a second blend value B2. Upon completion of the ratio shift in the transmission 20, the ECU 36 can ramp down the blend factor B in a linear manner from the second blend value B2 to the first blend value B1.

The blend factor B can be a function of the shift signal S. That is, the blend factor B can be initiated and terminated by the shift signal S. Exemplary blending techniques can be any technique known in the art, such as, but not limited to, a simple linear blend technique or a map based blend using time and a blend factor. This blending process can prevent, or at least minimize, a sudden change or step in the signal to the rear differential assembly 30 due to a mismatch in the torque signals T1, T2. The blending process can be performed by the ECU 36, either by hardware alone, or in combination with software. However, it is not necessary to blend the torque signals T1, T2 determined by the ECU 36. Also, if the torque signals T1, T2 match closely, then it may be possible to forgo the blending process.

Alternatively, the ECU 36 can be configured to simply switch from the first torque signal T1 to the second torque signal T2 based on the shift signal S. This approach may be appropriate when robustness or extremely fine precision in the control signal sent by the ECU 36 to the rear differential assembly 30 is not desirable.

In the example depicted by FIG. 2, the shift signal S has a first shift value S1 from the start time t0 to the first time t1 in the first period I, a second shift value S1-2 from the first time t1 to the third time t3 in the second period II and a third shift value S2 from the third time t3 forward in the third period III. The first value S1 can correspond to a signal to the transmission 20 to hold the engagement of the first gear ratio. The second shift value S1-2 can correspond to a signal to the transmission 20 to disengage the first gear ratio and engage the second gear ratio. The third shift value S2 can correspond to a signal to the transmission 20 to hold the engagement of the second gear ratio.

When the ECU 36 determined that the shift signal S has changed from the first shift value S1 to the second shift value S1-2, the ECU 36 can ramp up the blend signal B from the first blend value to the second blend value B2. The ramp up can occur at the first time t1 and can end at a second time t2 that lies intermediate the first time t1 and the third time t3 and lies closer to the first time t1 than to the third time t3, as is depicted in FIG. 2. Although FIG. 2 illustrates the ramp up as being linear, any slope can be used for the blend signal B from the first time t1 to the second time t2 in accordance with a particular application of the disclosed subject matter.

The ECU 36 can maintain the blend signal B at the second value B2 from the second time t2 until the ECU 36 determines that the shift signal S has changed to the third value S2. Subsequently, the ECU 36 can ramp down the blend signal B from the second value B2 back to the first value B1 from the third time t3 (where the shift signal changes to the third value S2) to a fourth time t4. Although FIG. 2 illustrates the ramp down as being linear, any slope can be used for the blend signal B from the third time t3 to the fourth time t4 in accordance with a particular application of the disclosed subject matter.

FIG. 2 also depicts the difference between the third time t3 and the fourth time t4 to be greater than the difference between the first time t1 and the second time t2. However, any time interval can be used, as deemed appropriate to obtain the desired performance for the powertrain 10 for a given application.

The ECU 36 can continuously calculate the mass, m, from the start time t0 to the first time t1. In this example, the ECU 36 can then store the value of the mass, m, when the second shift value S1-2 is detected. And, the ECU 36 can subsequently cease calculation of the mass, m, when the second shift value S1-2 is detected. Then, the ECU 36 can use this stored value of the mass, m, for the calculation of the second torque signal T2. The ECU 36 then can resume calculation of the mass, m, after the shift signal S no longer has the second shift value S1-2, such as at the third time t3. The ECU 36 can repeat this process before and after each similar change in the shift signal S for the remaining gear ratios of the transmission 20.

Alternatively, the ECU 36 can use a value of the mass, m determined at any time between the start time t0 and the first time t1 for the calculation of the second torque signal T2, described above. In another alternate embodiment, ECU 36 can be configured with hardware and/or software to essentially ignore any value calculation of the mass, m, determined after the first time t1 and before the third time t3. In another alternate embodiment the ECU 36 can store a series of calculated values for the mass, m, that continues through each change in gear ratio of the transmission 20. The ECU 36 can then process this series of values to obtain a running average value for the mass, m, which average value can then be used to calculate the second torque signal T2.

Figure 3:
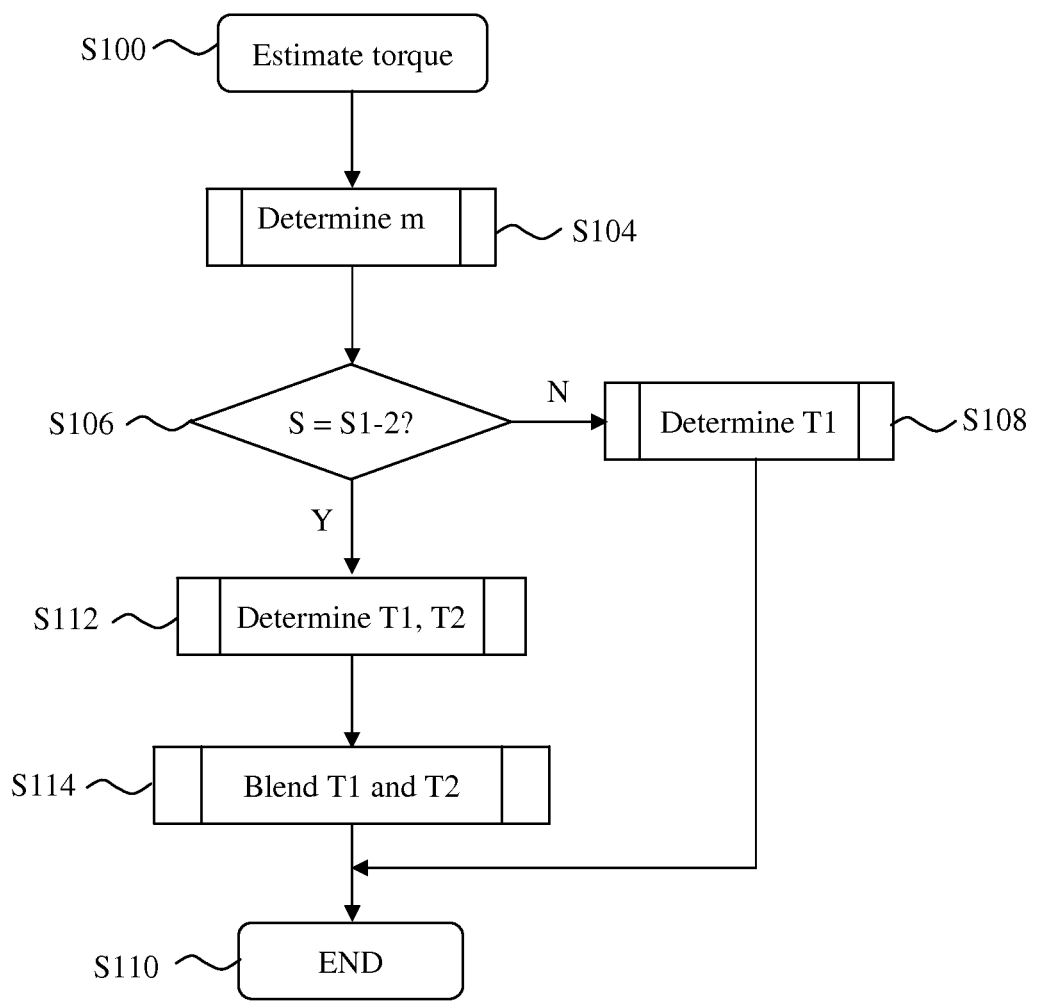
FIG. 3 is a flowchart depicting an algorithm in accordance with principles of the disclosed subject matter.

FIG. 3 illustrates an exemplary embodiment of an algorithm that the ECU 36 can follow in order to implement the features described with respect to FIG. 2. The ECU 36 can begin the estimation of torque algorithm at step S100. Then the ECU 36 can proceed to step S104.

The ECU 36 can determine the mass, m, of the vehicle 12 at S104. As described above, the mass, m, can be calculated by the ECU 36 based on the acceleration signal aL and the first torque signal T1. The acceleration signal aL can be filtered by the accelerometer 41 or the ECU 36, as described above. If the acceleration signal aL is filtered by the ECU 36, such filtering can occur during step S104. Then, the ECU 36 can proceed to step S106.

At step S106, the ECU 36 can determine the shift status of the transmission 20. If the transmission 20 is holding the currently selected gear ratio, then the shift signal can have a value corresponding to the first shift value S1. If the transmission 20 is in the process of shifting from one gear ratio to another gear ratio, then the shift signal S can have a value corresponding to the second shift signal S1-2.

If the ECU 36 determines at step S106 that the shift signal S has a value that is not equal to the second shift signal S1-2, then ECU 36 can proceed to step S108 to estimate the transmission output torque based on the first torque signal T1. The ECU 36 can use any algorithm known in the art to determine the first torque signal T1, as described above.

Upon completion of step S108, the ECU can proceed to step S110 where the ECU 36 can exit the torque estimation subroutine.

If the ECU 36 determines at step S106 that the shift signal S has a value that equals the second shift signal S1-2, then the ECU 36 can proceed to step S112. At step S112, the ECU 36 can determine the first torque signal T1 and the second torque signal T2, as described above.

Upon completing step S110, the ECU 36 can proceed to step S114. At step S114, the ECU 36 can use the blend factor B to blend the first torque signal T1 and the second torque signal T2, as described above, to determine a blended torque estimate value which can be used by the ECU36 to control various operational parameters of the vehicle, including but not limited to changeover determination between two wheel and all wheel drive, etc. Subsequently, the ECU 36 can proceed to step S110 where the ECU 36 exits the torque estimation subroutine.

While certain embodiments of the invention are described above, it should be understood that the disclosed subject matter can be embodied and configured in many different ways without departing from the spirit and scope of the invention. For example, the ECU 36 can set flag(s) to recalculate the vehicle mass, m, when the vehicle 12 is subject to certain condition(s), such as, but not limited to, coming to a stop for a predetermined period of time, a change in load on the suspension greater than a predetermined difference, change in ignition status from off to on, and after a predetermined elapsed time. These flags can provide the ECU 36 with the ability to accurately estimate the vehicle mass, m, as the number of passengers and amount of cargo change.

In another exemplary embodiment, the ECU 36 also can control the transmission 20 and or the power source 18. Alternatively, the ECU 36 can control other vehicle dynamic control systems such as, but not limited to, traction control, stability control, and launch control.

In another exemplary embodiment, the final drive torque signal determined by the ECU 36 can be sent to any other ECU or system that may need an accurate drive torque signal, such as, but not limited to, a stability control system.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A system for controlling a powertrain of a vehicle having an engine configured to output a variable torque, a transmission with a plurality of gear ratios and selectively driven by the variable torque, and a pair of wheels selectively driven by the transmission, the system comprising:
   a longitudinal acceleration sensor; and
   a controller in electrical communication with the longitudinal acceleration sensor and configured to,
      determine an inertial value of the vehicle based on data from the longitudinal acceleration sensor prior to a shift from one of the plurality of gear ratios to another of the plurality of gear ratios;
      determine a first estimate of a real-time torque value based on at least one of an engine map, the plurality of gear ratios, a torque converter map, and driveline losses; and
      determine a second estimate of a real-time torque value based on the inertial value and data from the longitudinal acceleration sensor during the shift from the one of the plurality of gear ratios to the another of the plurality of gear ratios.

2. The system for controlling a powertrain of a vehicle according to claim 1, wherein the controller is further configured to:
   blend the first estimate with the second estimate during the shift from the one of the plurality of gear ratios to the another of the plurality of gear ratios.

3. The system for controlling a powertrain of a vehicle according to claim 1, wherein the controller is in electrical communication with the transmission and is configured to,
   receive a shift signal indicative of a change in the transmission from the one of the plurality of gear ratios to the another of the plurality of gear ratios; and
   blend the first estimate with the second estimate while the controller receives a signal that the transmission is changing gear ratios.

4. The system for controlling a powertrain of a vehicle according to claim 1, wherein the controller is configured to blend the first estimate with the second estimate using a linear blend technique or a blend map.

5. The system for controlling a powertrain of a vehicle according to claim 1, wherein one of the longitudinal acceleration sensor and the controller is configured to filter data obtained by the longitudinal acceleration sensor.

6. The system for controlling a powertrain of a vehicle according to claim 5, wherein the one of the longitudinal acceleration sensor and the controller is configured to filter data using a low pass filter or a band pass filter.

7. The system for controlling a powertrain of a vehicle according to claim 1, wherein the powertain is a selective all wheel drive system in which the vehicle can change from two wheel drive to four wheel drive depending on at least one variable including at least one of operator input and an input from a sensor on the vehicle.

8. The system for controlling a powertrain of a vehicle according to claim 1, wherein the longitudinal acceleration sensor is configured to measure acceleration of a vehicle in a direction along a forward drive path of the vehicle.

9. The system for controlling a powertrain of a vehicle according to claim 1, wherein the controller is further configured to determine a third estimate of real-time torque based on a combination of the first estimate and the second estimate.

10. A method for controlling an all-wheel drive powertrain of a vehicle having an engine outputting a variable torque, a transmission with a plurality of gear ratios and selectively driven by the variable torque of the engine, a pair of wheels selectively driven by the transmission, and a longitudinal acceleration sensor, the method comprising:
   determining an inertial value of the vehicle based on data from the longitudinal acceleration sensor prior to a shift from one of the plurality of gear ratios to another of the plurality of gear ratios;
   determining a first estimate of a real-time torque value based on at least one of an engine map, the plurality of gear ratios, a torque converter map, and driveline losses; and
   determining a second estimate of a real-time torque value based on the inertial value and data from the longitudinal acceleration sensor during the shift from the one of the plurality of gear ratios to the another of the plurality of gear ratios.

11. The method for controlling an all-wheel drive powertrain of a vehicle according to claim 10, further comprising:
   blending the first estimate with the second estimate during the shift from one of the plurality of gear ratios to the another of the plurality of gear ratios.

12. The method for controlling an all-wheel drive powertrain of a vehicle according to claim 10, further comprising:
   receiving a shift signal indicative of a change in the transmission from the one of the plurality of gear ratios to the another of the plurality of gear ratios; and
   blending the first estimate with the second estimate when the shift signal is received.

13. The method for controlling an all-wheel drive powertrain of a vehicle according to claim 12, wherein the blending includes:
   using a linear blend technique or a blend map on the first and second estimates.

14. The method for controlling an all-wheel drive powertrain of a vehicle according to claim 10, wherein the determining the second estimate includes:
   filtering data from the longitudinal acceleration sensor.

15. The method for controlling an all-wheel drive powertrain of a vehicle according to claim 14, wherein the filtering includes:
   using a low pass filter or a band pass filter on the data from the longitudinal acceleration sensor.

16. A vehicle powertrain comprising:
   an engine configured to output a variable torque;
   a transmission including a plurality of gear ratios, the transmission selectively driven by the variable torque;
   a pair of wheels selectively driven by the transmission;
   a longitudinal acceleration sensor; and
   a controller in electrical communication with the longitudinal acceleration sensor and configured to,
      determine an inertial value of the vehicle based on data from the longitudinal acceleration sensor prior to a shift from one of the plurality of gear ratios to another of the plurality of gear ratios,
      determine a first estimate of a real-time torque value based on at least one of an engine map, the plurality of gear ratios, a torque converter map, and driveline losses; and
      determine a second estimate of a real-time torque value based on the inertial value and data from the longitudinal acceleration sensor during the shift from the one of the plurality of gear ratios to the another of the plurality of gear ratios.

17. The powertrain according to claim 16, wherein the controller is further configured to,
blend the first estimate with the second estimate during the shift from the one of the plurality of gear ratios to the another of the plurality of gear ratios.

18. The powertrain according to claim 16, wherein the controller is in electrical communication with the transmission and is configured to,
receive a shift signal indicative of a change in the transmission from the one of the plurality of gear ratios to the another of the plurality of gear ratios, and
blend the first estimate with the second estimate when the controller receives a signal that the transmission is changing gear ratios.

19. The vehicle powertrain according to claim 16, further comprising:
a clutch assembly selectively coupling the pair of wheels to the transmission and in electrical communication with the controller; and
a second pair of wheels driven by the transmission independently of the clutch assembly.

20. The vehicle powertrain according to claim 16, wherein the powertrain is a selective all wheel drive system in which the vehicle can change from two wheel drive to four wheel drive depending on at least one variable including at least one of operator input and an input from a sensor on the vehicle.

* * * * *